United States Patent
Raux (10) Patent No.: US 9,851,790 B2
(45) Date of Patent: Dec. 26, 2017

(54) GAZE BASED NOTIFICATION REPONSE

(71) Applicant: Lenovo (Singapore) Pte. Ltd., Singapore (SG)

(72) Inventor: Antoine Roland Raux, Cupertino, CA (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/634,078

(22) Filed: Feb. 27, 2015

(65) Prior Publication Data

US 2016/0252957 A1 Sep. 1, 2016

(51) Int. Cl.
- *G06F 3/01* (2006.01)
- *G06F 3/16* (2006.01)
- *G06F 3/03* (2006.01)

(52) U.S. Cl.
CPC ............ *G06F 3/013* (2013.01); *G06F 3/0304* (2013.01); *G06F 3/167* (2013.01)

(58) Field of Classification Search
CPC ... G06F 3/013; G06F 3/038; G06F 2203/0381
See application file for complete search history.

(56) References Cited

U.S. PATENT DOCUMENTS

| | | | |
|---|---|---|---|
| 6,204,828 B1* | 3/2001 | Amir | G06F 3/013 345/156 |
| 6,621,800 B1* | 9/2003 | Klein | H04M 3/533 370/282 |
| 2006/0210958 A1* | 9/2006 | Rimas-Ribikauskas | G09B 7/00 434/362 |
| 2006/0256133 A1* | 11/2006 | Rosenberg | G06Q 30/02 345/619 |
| 2009/0055500 A1* | 2/2009 | Haynes | H04L 12/1827 709/207 |
| 2010/0318576 A1* | 12/2010 | Kim | G06Q 10/04 707/802 |
| 2011/0175932 A1* | 7/2011 | Yu | G06F 3/048 345/661 |
| 2013/0169560 A1* | 7/2013 | Cederlund | G06F 3/013 345/173 |
| 2013/0311925 A1* | 11/2013 | Denker | G06F 3/013 715/771 |
| 2014/0002341 A1* | 1/2014 | Nister | G06F 3/013 345/156 |
| 2014/0168056 A1* | 6/2014 | Swaminathan | G06K 9/00604 345/156 |

* cited by examiner

*Primary Examiner* — Ariel Balaoing
(74) *Attorney, Agent, or Firm* — Ference & Associates LLC (57) ABSTRACT

One embodiment provides a method, including: displaying, on a display device, at least one notification; detecting, at an electronic device, a location of user gaze associated with the location of the at least one notification; determining, using a secondary detection, if a secondary input is detected; performing, based on the determining, at least one action. Other aspects are described and claimed.

18 Claims, 5 Drawing Sheets

GAZE BASED NOTIFICATION REPONSE

BACKGROUND

As devices and technology have become more a part of our everyday lives, we, as device users, have become very dependant on their abilities. Some of their most useful abilities involve organizing our schedules, enabling communication with others, keeping us up-to-date on current events. As the devices have become more advanced, they have gained the ability to be personalized to what types of information we desire. Smart devices (e.g., computers, smart phones, tablets, smart watches, etc.) are able to inform us of these things we identify as important (e.g., friend's birthdays, sports score, breaking news, incoming communications, etc.)

However, these notifications of important events can become overwhelming or bothersome. Especially when we are attempting to remain focused on a separate activity. For example, having constant notifications appear on your computer screen while focused on a task at work can cause a distraction. Thus, a solution is required that allows a user to remain focused on their task at hand while dismissing, or if required, responding to the abundance of notifications they receive.

BRIEF SUMMARY

In summary, one aspect provides a method, comprising: displaying, on a display device, at least one notification; detecting, at an electronic device, a location of user gaze associated with the location of the at least one notification; determining, using a secondary detection, if a secondary input is detected; performing, based on the determining, at least one action.

Another aspect provides an information handling device, comprising: a display device; a sensor; a processor; a memory device that stores instructions executable by the processor to: display at least one notification on the display device; detect using the sensor a location of user gaze associated with the location of the at least one notification; determine, using a secondary detection, if a secondary input is detected; perform, based on the determining, at least one action.

A further aspect provides a product, comprising: a storage device having code stored therewith, the code being executable by the processor and comprising: code that displays, on a display device, at least one notification; code that detects, at an electronic device, a location of user gaze associated with the location of the at least one notification; code that determines, using a secondary detection, if a secondary input is detected; code that performs, based on the determining, at least one action.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

In a world where we are in constant contact with loved ones, co-workers, social media, and news outlets, the constant barrage of incoming information can become overwhelming. With limited time during work hours to be productive, users need to be able to selectively dismiss and respond to their notifications without ceasing their current task. For example, if a user is using their computer, they could receive incoming notifications (e.g., emails, instant messaging, software download/update/installation completion, news reports, etc.), which can inhibit their ability to focus on a singular task.

Currently, in a typical scenario, reacting to these notifications requires a user to click on the notification (e.g., pop up window, application dialog box, etc.). Once the notification is selected, depending on the task, additional user action may be required (e.g., selecting an action from a menu, minimizing/switching windows to an alternate application, composing a communication response, etc.). This action can lead to a significant disruption or multiple disruptions over a period of time, distracts from the user's main task they are attempting to focus on.

The technical issue presents problems for a user in which they are attempting to remain focused on a particular task, but may also be required to respond to incoming communications. Not only does the act of reading/responding to notification distract the user, but it typically requires the user to switch software applications (e.g., from a word processing application to an email or instant messaging application). However, using an alternative method of user input (e.g., voice, eye gaze, etc.) gives the user a more fluid and less intrusive method of responding. This method is more convenient in many scenarios (e.g., an office work setting, informal business meeting, while traveling) than current technological solutions.

Accordingly, an embodiment provides a method of displaying on a display screen, a notification. The notification properties can vary based on application and user preference. In addition to displaying a notification, the user's gaze is being tracked through some sensing device (e.g., image capture device, video capture device, etc.). When it is detected that the user's gaze has moved to the location of the notification, a secondary input device (e.g., microphone, etc.) is activated. The user then inputs a secondary input, via the secondary input device, regarding the notification. An action is then taken based on the user's secondary input (e.g., sending a communication, opening an application, etc.).

Another embodiment provides a method of displaying on a display screen a notification. As before, in addition to displaying a notification, the user's gaze is being tracked through some sensing device, and when it is detected that the user's gaze has moved or focused of the notification, a secondary input device is activated. However, unlike the above embodiment, the user does not input a secondary input, via the secondary input device, regarding the notification. Instead, the user's focus (i.e., their gaze) moves away from the notification and back to their previous task. Therefore, the action taking by the user indicates a choice of inaction regarding the notification and thus the notification is dismissed.

The illustrated example embodiments will be best understood by reference to the figures. The following description is intended only by way of example, and simply illustrates certain example embodiments.

Figure 1:
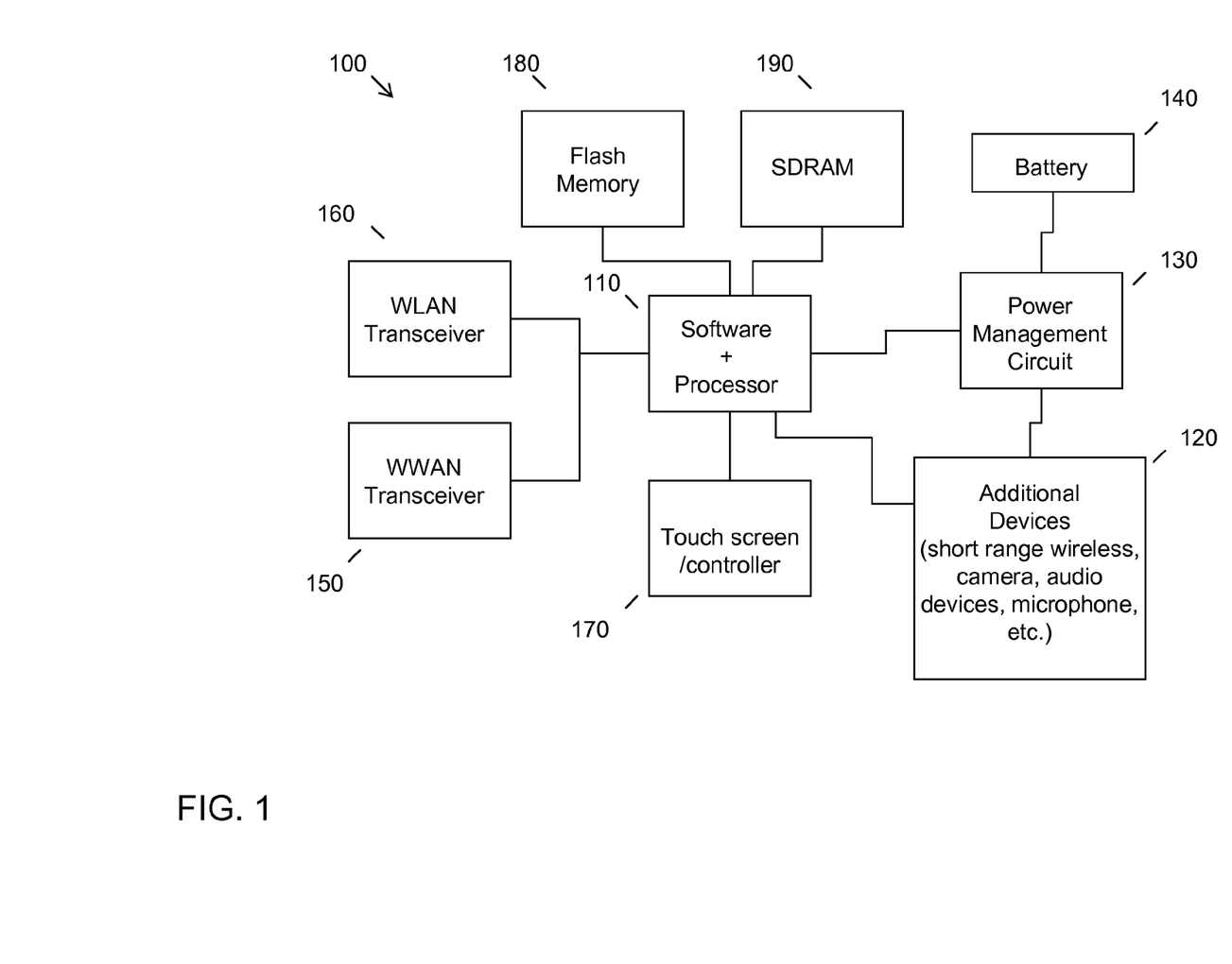
FIG. 1 illustrates an example of information handling device circuitry.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera. System 100 often includes a touch screen 170 for data input and display/rendering. System 100 also typically includes various memory devices, for example flash memory 180 and SDRAM 190.

Figure 2:
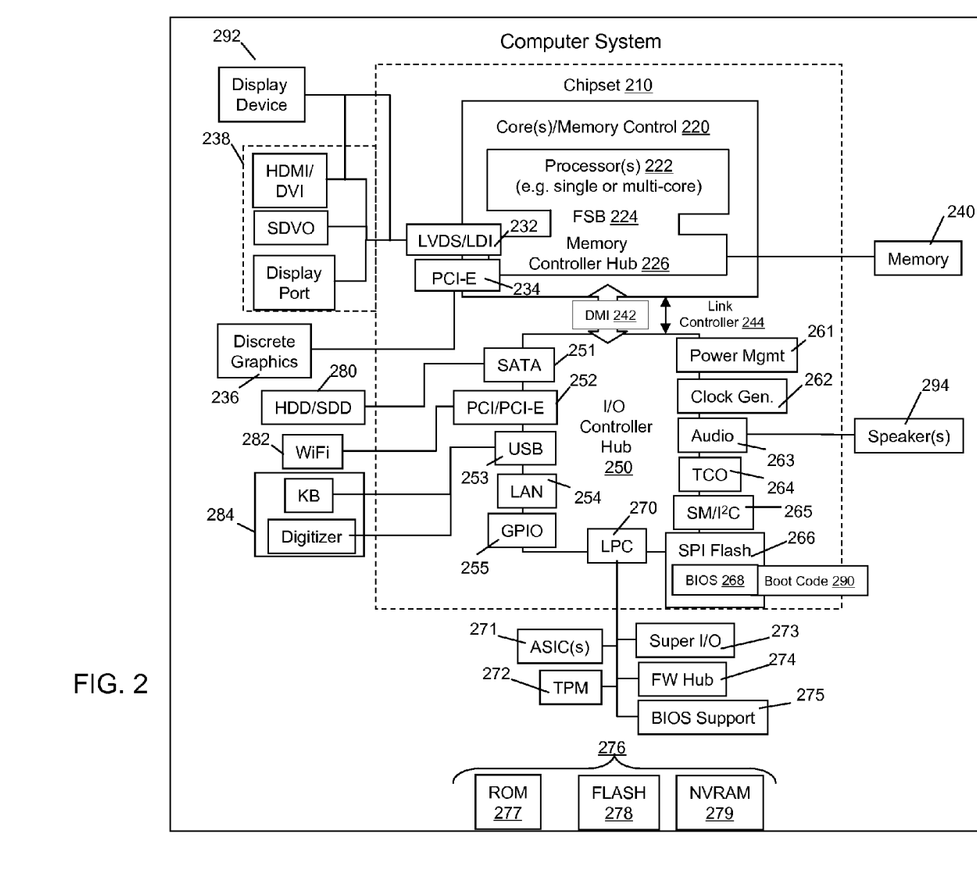
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices which users may employ various functions (e.g., tracking user gaze, receiving voice input, receiving image input, etc.). For example, the circuitry outlined in FIG. 1 may be implemented in a tablet or smart phone embodiment, whereas the circuitry outlined in FIG. 2 may be implemented in a personal computer embodiment.

Figure 3:
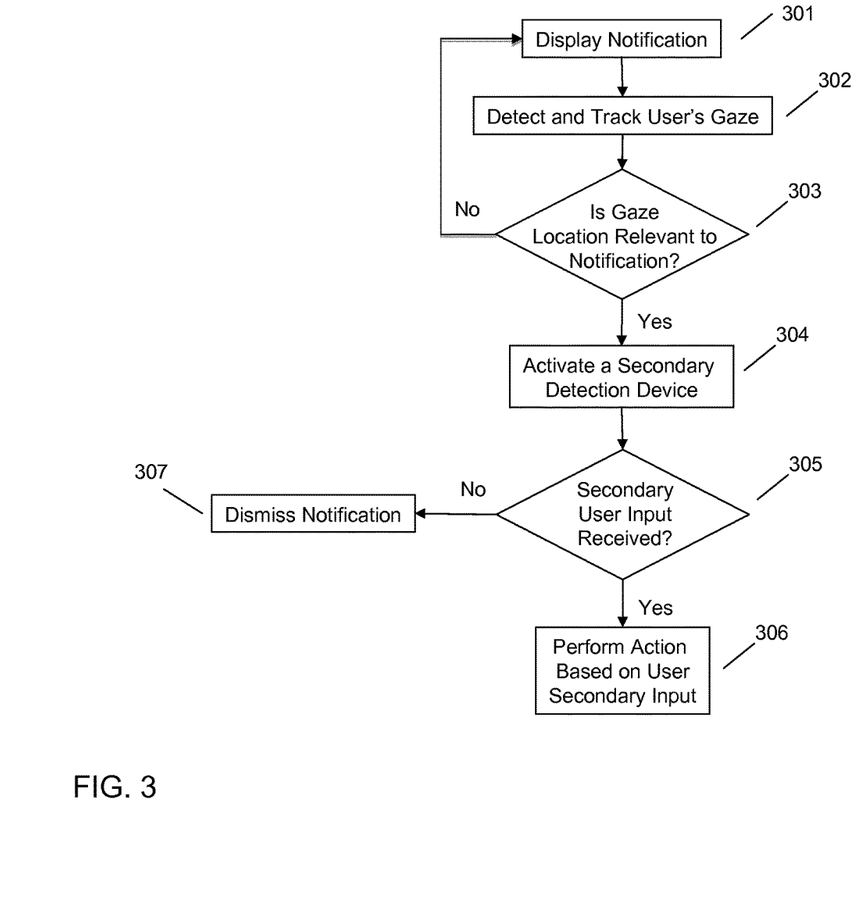
FIG. 3 illustrates an example method of responding to a notification through gaze tracking and secondary input.

Referring now to FIG. 3, in an embodiment, a notification is displayed 301. For example, 401 and 501 in FIG. 4 and FIG. 5 respectively. Typically, the notification is a visual indicator designed to pass along information to the user. For example, the notification could inform the user that they have recently received an incoming communication (e.g., an email, phone call, instant message, social media post referencing them, etc.) Additionally or alternatively, the notification could inform the user of any general information of interest to them (e.g., weather, news stories, sports scores, package shipment information, etc.) Almost anything that a user might consider important to their lives can be displayed via a visual notification 301.

In order to ensure that the user receives the notification 301, the location, timing, and properties of the notification can vary. For example, if a user has multiple monitors, the notification can be designed to appear on the monitor identified as the primary monitor. In addition, the exact location of the notification on the display screen can be altered (e.g., top right of the screen, bottom right of the screen, etc.). The size of the notification can also be adjusted relevant to the display screen size of the device. For example, if a user where using a smart phone, the notification would need to be much smaller in size than if the user were using their laptop or desktop computer. These notification properties can be altered through user selection based on the user's preference, third party software application preference, the current task of the user, or the like.

Additionally or alternatively, an embodiment may display multiple notifications on the same screen. These notifications can be from the same application (e.g., multiple email messages that where received simultaneously) or from various applications (e.g., one from an instant message application, one from an email application, one from a news application, etc.). As above, each notification may have separate properties from other notifications, thus their locations and sizes can vary.

In an additional embodiment, a user's gaze is tracked 302. For example, 402 and 502 in FIG. 4 and FIG. 5 respectively. Using gaze detection and tracking allows a software application to determine where the user's focus is. This allows any additional input (e.g., a secondary input) to be utilized by an application the notification is referencing. For example, the location of a user's gaze may be detected by a sensor device. The device could be located within or adjacent to the display device. The sensor can track where the user's gaze is located through various methods. By way of example, the sensor may be an image capture device (e.g., a webcam or like device) that uses gaze tracking software to analyze the image and determine where the user's gaze is located within the display screen. Other example sensors include a video capture device, a range imaging device, a 3D scanning device, or the like. Depending on the needs of the embodiment and the known surroundings, the type of sensor device can and should vary accordingly.

Figure 5:
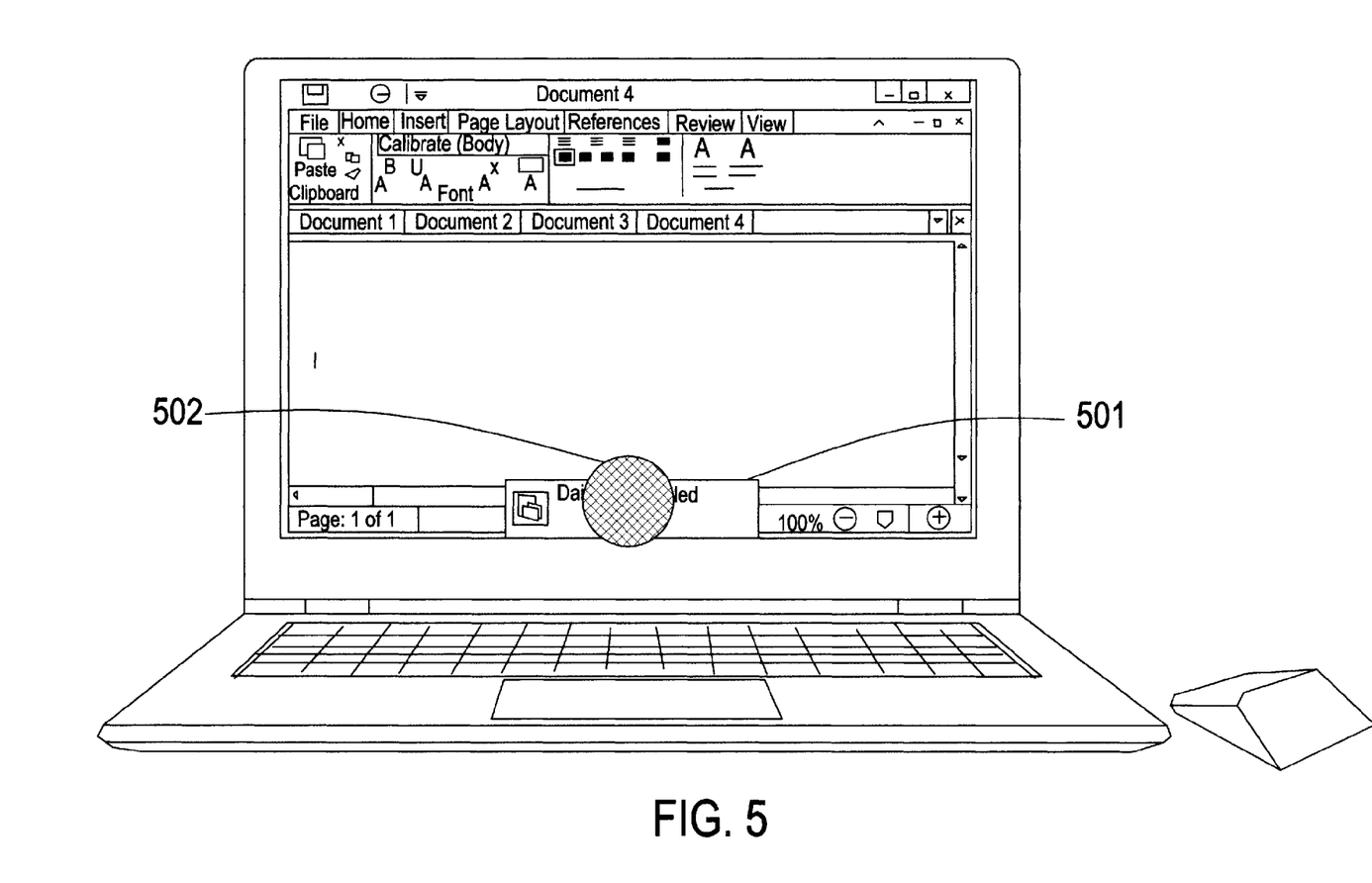
FIG. 5 illustrates an example display screen where a user's gaze is on the notification being displayed.

Once the user's gaze is located, an embodiment will determine if the user's gaze is relevant to the notification 303. For example, if the user is looking 502 at the notification 501 the software can interpret that to mean the user is focused on the notification and respond accordingly. In a further example, the user's gaze could be focused not only on the notification itself, but on any particular image displayed on the screen (e.g., the notification, a predetermined display location, an icon, etc.).

In an embodiment, after the determination that the user's gaze is relevant to the notification 303, the device (e.g., user's computer, tablet, or the like) activates a secondary detection device 304. The secondary detection device can be any type of typical user input method (e.g., keyboard, mouse, microphone, camera, etc.) By way of example, one of the secondary detection devices could be an image sensor device similar to that used to track the user's gaze. An embodiment may allow for detection of actions that are relative to a user's gaze. For example, a user's facial expressions or head movements (e.g., winking, nodding, etc.) may be tracked and used as input. These facial expressions or head movements may be received at the secondary detection devices 304.

Additionally or alternatively, an embodiment may use an audio capture device (e.g., a microphone on a laptop or smartphone). By way of example, after it is determined that a user's gaze is relevant to the notification 303, and the secondary detection device is active, a user can simply speak their desired actions. As a further example, when an email notification appears on a user's screen, and the user's gaze is tracked to the notification location, the secondary detection of the user speaking a command such as "reply, Ok sounds good see you at 8" may be used to automate a response for the user. This is not intended to be a limiting example, as the user could also request further details about a news story, ask to see a more detailed weather forecast, or any of the like.

Figure 4:
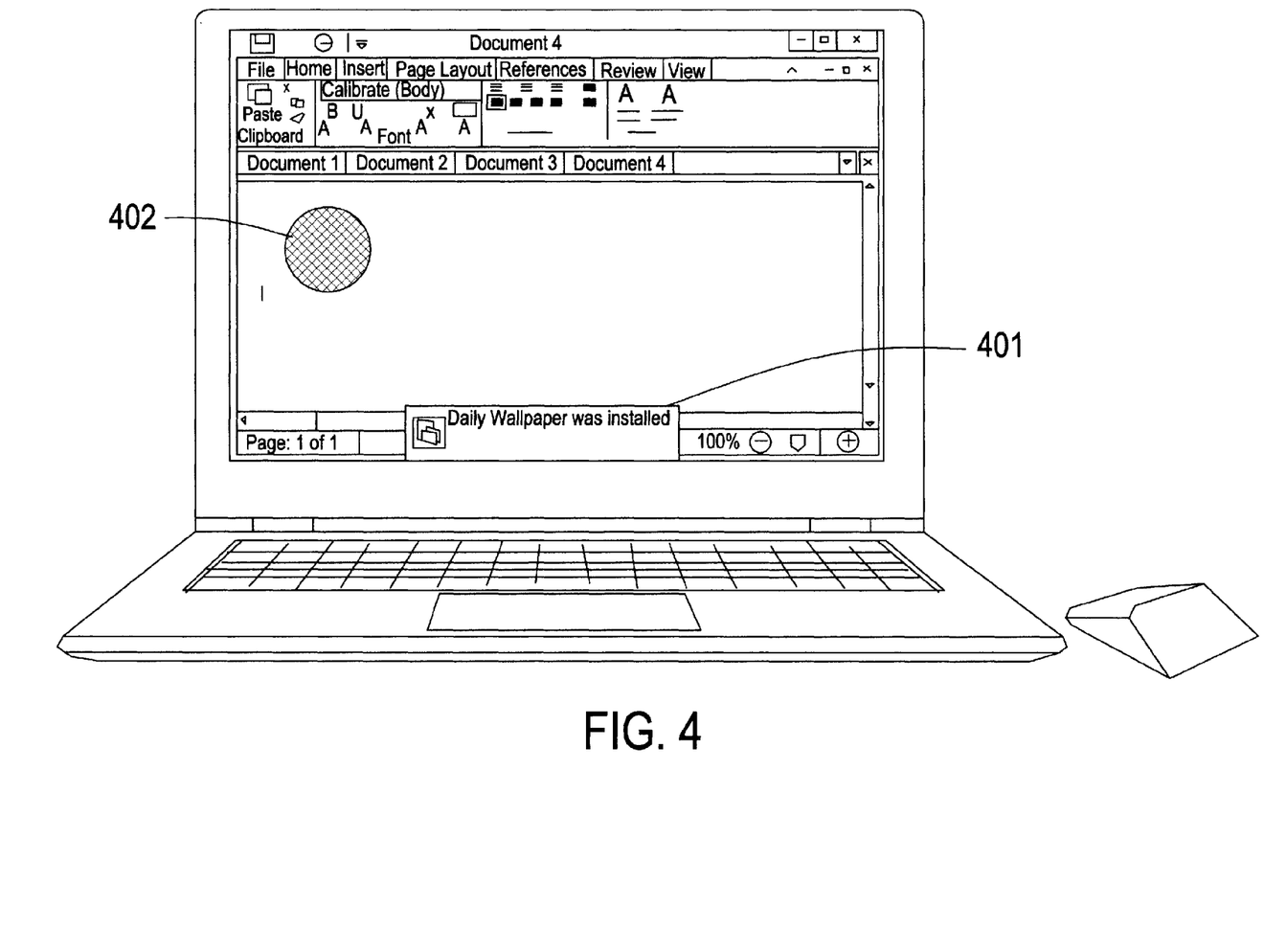
FIG. 4 illustrates an example display screen where a user's gaze is not on the notification being displayed.

In an embodiment, after the secondary detection device is active 304, a determination is made as to whether any type of secondary input was detected 305. If no secondary input is received, the notification may be dismissed 307. By way of clarifying example, if a user receives a notification about a breaking news story, and the user's gaze is tracked to the location of the notification 303, it can be assumed that the user saw and processed the summary or title of the breaking news story. If after acknowledging the notification 501 (e.g., by looking at it 502) the user determines no action is required or desired on their part they may avert their gaze and continue working on their previous task 402. By not entering any secondary input, the user has signaled their intent to disregard the notification. Thus, the notification 501, 401 may be dismissed without taking any further action.

This process allows the user to dismiss a notification without requiring them to move their focus away from their current task. For example, if the user is working in a word processing document, they are not required to minimize or move their application in order to access the notification and manually dismiss it as currently required. Additionally, an embodiment would keep the notifications visible 401, 501 until an act such as that outlined above takes place. This would ensure that the user sees 502 the notification 501, and has the chance to respond accordingly. Currently, typical notifications operate based on a time decay format (i.e., each notification comes with a time to live property allowing them to only be shown on the screen for a predetermined period of time). This can cause issues especially if a user is away from their device, or their attention is somewhere other than the display screen.

Additionally or alternatively, an embodiment may, after the secondary detection device is active 304, make a determination that a secondary input is received 305. Once the determination is made that a secondary input was received, an action based on that secondary input takes place. The secondary input may be any of the above discussed examples. Continuing from an above example, an email notification appears on a user's screen. The user's gaze is tracked to the notification location, activating the secondary detection, and the user speaks the command "reply, Ok sounds good see you at 8." Once this secondary input is received, an action is performed based on the input 306, such an action could consist of a software application used for email being opened (e.g., Outlook, etc.) and a reply email being composed and sent as the user instructed through voice commands.

Another embodiment may, after the secondary detection device is active 304, make a determination that a secondary input is received 305. Again as above, once the determination is made that a secondary input was received, an action based on that secondary input takes place. For example, a user receives a breaking news notification. The user's gaze is tracked to the notification location, causing the activation of the secondary detection, and the user speaks the command "Tell me more about this news story." Once this secondary input is received, the software application related to this news article (e.g., a web browser, a new specific mobile application, etc.) will open 306 and the user will be directed to the breaking news referenced in the notification.

In an additional embodiment, the secondary input may not be sufficient to complete all the desired tasks of the user. Thus, additional input may be required after the first action is taken 306. In a continuation of an above example, an email notification appears on a user's screen. The user's gaze is tracked to the notification location 502, activating the secondary detection. However, in contrast to the above example, the user needs to compose a more detailed reply message. Thus the user speaks the command "reply." Once this secondary input is received, an action is performed based on the input 306 and the content of the notification that the user was looking at 303, such an action could consist of a software application used for email being opened (e.g., outlook etc.) and a reply email to the sending party (i.e., the party that sent the email causing the original notification) being created. This allows the user to manually type the body of the email as they would typically do. However, the use of the gaze tracking 402, 502 and secondary input creates a quicker and easier transition into composing an email response.

Accordingly, as illustrated by the example embodiments and figures, an embodiment provides a method of receiving a notification 401, 501 on a display device. Tracking the user's attention (via their gaze 402, 502) to determine if they have taken notice of the notification. When it is detected that the user's focus has shifted to the notification location 502 and the secondary input detection device (e.g., a microphone, camera, etc.) is activated, receiving a secondary input from the user. Based on this secondary input, an action is taken (e.g., responding to a communication, opening a software application etc.).

The various embodiments described herein thus represent a technical improvement to the receiving of a notification on a display device. Such as, tracking the user's attention (via their gaze) to determine if they have taken notice of the notification. Detecting when the user's focus has shifted to the notification and activating a secondary input detection device (e.g., a microphone, camera, etc.). If no secondary input is received and the user's gaze has moved on from the notification, the notification is dismissed (i.e., no longer displayed on the display device). Not only does this allow the user to dismiss a notification without requiring them to stop their current task, but it also ensures that the user sees the notification.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   displaying, on a display device, at least one notification;
   detecting, at the display device, a location of user gaze associated with the location of the at least one notification;
   obtaining, using a processor, relevance of the user gaze to the at least one notification, wherein relevance is based on the tracking of the user gaze;
   automatically activating, based on the obtaining, a secondary detection device associated with the display device;
   receiving, at the secondary detection device, a secondary input;
   performing, based on the secondary input, at least one action responsive to the at least one notification.

2. The method of claim 1, wherein the secondary input comprises voice input.

3. The method of claim 1, wherein:
   the at least one notification comprises two or more notifications; and
   the detecting comprises determining, based on the location of the user gaze, which of the two or more notifications is associated with the location of the user gaze.

4. The method of claim 1, wherein the at least one action comprises sending a communication.

5. The method of claim 1, wherein the at least one action comprises opening a software application.

6. The method of claim 1, wherein the secondary input comprises facial manipulation input.

7. The method of claim 1, wherein the secondary detection device is activated by the location of user gaze being focused on an image on the display device selected from a group consisting of: the notification, a predetermined display location, and an icon.

8. The method of claim 1, wherein the relevance of the user gaze to the at least one notification comprises no relevance and wherein the at least one action is a dismissal of the at least one notification.

9. The method of claim 1, wherein properties of the notification are based on a factor selected from a group consisting of: user selection, third party application preference, and current device task.

10. An information handling device, comprising:
    a display device;
    a sensor;
    a processor;
    a memory device that stores instructions executable by the processor to:
    display at least one notification on the display device;
    detect, using the sensor, a location of user gaze associated with the location of the at least one notification;
    obtain, using a processor, relevance of the user gaze to the at least one notification, wherein relevance is based on the tracking of the user gaze;
    automatically activate, based on the obtaining, a secondary detection device associated with the display device
    receiving, at the secondary detection device, a secondary input;
    perform, based on the secondary input, at least one action responsive to the at least one notification.

11. The information handling device of claim 10, wherein the secondary detection device detects voice input.

12. The information handling device of claim 10, wherein:
    the at least one notification comprises two or more notifications; and
    the detecting comprises determining, based on the location of the user gaze, which of the two or more notifications is associated with the location of the user gaze.

13. The information handling device of claim 10, wherein the at least one action comprises sending a communication.

14. The information handling device of claim 10, wherein the at least one action comprises opening a software application.

15. The information handling device of claim 10, wherein the secondary detection device detects facial manipulation input.

16. The information handling device of claim 10, wherein the secondary detection is activated by the location of user gaze being focused on an image on the display device selected from a group consisting of: the notification, a predetermined display location, and an icon.

17. The information handling device of claim 10, wherein relevance of the user gaze to the at least one notification comprises no relevance and wherein the at least one action is a dismissal of the at least one notification.

18. A product, comprising:
    a storage device having code stored therewith, the code being executable by a processor and comprising:
    code that displays, on a display device, at least one notification;
    code that detects, at an electronic display device, a location of user gaze associated with the location of the at least one notification;
    code that obtains, using the processor, relevance of the user gaze to the at least one notification, wherein relevance is based on the tracking of the user gaze;
    code that automatically activates, based on the code that obtains, a secondary detection device associated with the display device
    code that receives at, the secondary detection device, a secondary input;
    code that performs, based on the secondary input, at least one action responsive to the at least one notification.

* * * * *